(12) United States Patent
Lerch et al.

(10) Patent No.: US 12,139,104 B2
(45) Date of Patent: Nov. 12, 2024

(54) AUTOMATIC CAR-KEY PAIRING BASED ON WIRELESS PAIRING

(71) Applicant: Apple Inc., Cupertino, CA (US)

(72) Inventors: Matthias Lerch, San Francisco, CA (US); Gordon Y Scott, Cupertino, CA (US); Najeeb M Abdulrahiman, Fremont, CA (US); Oren M Elrad, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 17/716,843

(22) Filed: Apr. 8, 2022

(65) Prior Publication Data

US 2023/0322186 A1 Oct. 12, 2023

(51) Int. Cl.
| | |
|---|---|
| *H04W 4/80* | (2018.01) |
| *B60R 25/24* | (2013.01) |
| *G07C 9/00* | (2020.01) |
| *H04W 4/40* | (2018.01) |

(52) U.S. Cl.
CPC ........ *B60R 25/245* (2013.01); *G07C 9/00309* (2013.01); *H04W 4/40* (2018.02); *H04W 4/80* (2018.02); *G07C 2009/00539* (2013.01); *G07C 2009/00547* (2013.01)

(58) Field of Classification Search
CPC ................ B60R 25/245; B60R 25/209; B60R 2325/205; G07C 9/00309; G07C 2009/00769; G07C 9/23; G07C 2009/00539; G07C 2009/00547; H04W 4/40; H04W 4/80; H04W 12/04033; H04W 12/003
See application file for complete search history.

(56) References Cited

U.S. PATENT DOCUMENTS

| | | | |
|---|---|---|---|
| 10,940,830 B2 | 5/2021 | Stanfield | |
| 11,305,666 B2 | 4/2022 | Penilla | |
| 2014/0091903 A1* | 4/2014 | Birkel | B60R 25/241 340/5.64 |
| 2018/0326947 A1 | 11/2018 | Oesterling | |
| 2020/0120500 A1* | 4/2020 | Sharma | H04W 12/02 |

* cited by examiner

*Primary Examiner* — Vernal U Brown
(74) *Attorney, Agent, or Firm* — Kowert, Hood, Munyon, Rankin & Goetzel, P.C.

(57) ABSTRACT

An electronic device that at least semi-automatically performs car-key pairing is described. During operation, the electronic device may perform wireless pairing with a second electronic device (e.g., a vehicle), where the wireless pairing establishes a connection between the electronic device and the second electronic device. Moreover, during the wireless pairing, the electronic device may receive information associated with the car-key pairing of the electronic device and the second electronic device. Then, after the wireless pairing is completed, the electronic device may determine that the car-key pairing is supported or available based at least in part on the information. Next, the electronic device may selectively and at least semi-automatically perform the car-key pairing based at least in part on the information, where the car-key pairing enables the electronic device to function as a digital key for the second electronic device using wireless communication via the wireless pairing or another communication protocol.

20 Claims, 6 Drawing Sheets

AUTOMATIC CAR-KEY PAIRING BASED ON WIRELESS PAIRING

FIELD

The described embodiments relate, generally, to wireless communications among electronic devices, including techniques for selectively and automatically performing car-key pairing based at least in part on information exchanged during previous wireless pairing.

BACKGROUND

The increasing capabilities of widely available electronic devices is resulting in a variety of applications that leverage these capabilities. However, it can be complicated and time-consuming to configure electronic devices so that their capabilities can be used by an application.

For example, many electronic devices communicate with each other using wireless communication, such as a Bluetooth or a Bluetooth Low Energy communication protocol (from the Bluetooth Special Interest Group of Kirkland Washington), a CarPlay protocol (from Apple of Cupertino, California) or an Android Auto protocol (from Alphabet of Mountain View, California). However, in order to communicate with each other, electronic devices typically need to first establish a pairing or a connection. Then, once the pairing is completed, the onboarding processes for a particular application executing on or associated with an electronic device can be performed. However, this independent and serial approach increase the time and effort needed to configure the electronic device so that the application is available for use, which increases the frustration of a prospective user and, thus, decreases the likelihood that the application will be used by the prospective user.

SUMMARY

An electronic device that selectively and at least semi-automatically performs car-key pairing is described. This electronic device includes: an antenna node that can communicatively couple to an antenna; an interface circuit that communicates with a second electronic device; a processor; and memory storing program instructions. During operation, the electronic device performs wireless pairing with the second electronic device, where the wireless pairing establishes a connection between the electronic device and the second electronic device. Moreover, during the wireless pairing, the electronic device receives information associated with the car-key pairing of the electronic device and the second electronic device. Then, after the wireless pairing is completed, the electronic device determines that the car-key pairing is supported or available based at least in part on the information. Next, the electronic device selectively and at least semi-automatically performs the car-key pairing based at least in part on the information, where the car-key pairing enables the electronic device to function as a digital key for the second electronic device using wireless communication via the wireless pairing or another communication protocol.

Note that the wireless pairing may be compatible with a Bluetooth or a Bluetooth Low Energy communication protocol, a CarPlay protocol and/or an Android Auto protocol.

Moreover, the second electronic device may include a vehicle, such as a car, a truck, a bus, a bicycle, a moped, a motorcycle, etc.

Furthermore, the information may specify one or more of: whether the second electronic device is capable of (or supports) car-key pairing; whether software executing in an environment in the second electronic device is capable of the car-key pairing; whether an upgrade to the software is capable of the car-key pairing; whether there is an existing account associated with a user of the electronic device; whether proof of ownership of the second electronic device has been established; or whether a passcode associated with the car-key pairing has been received.

Note that, when proof of ownership has not been established, the electronic device may receive a secure token associated with the second electronic device. Then, the electronic device may provide, addressed to a computer, a request for the proof of ownership, where the request includes the secure token. Next, the electronic device may receive, associated with the computer, the proof of ownership.

Additionally, based at least in part on the information, the electronic device may select a starting point in a hierarchical process associated with the car-key pairing.

In some embodiments, the electronic device may include a portable electronic device, such as a cellular telephone.

Other embodiments provide the second electronic device that performs counterpart operations to at least some of the operations performed by the electronic device.

Other embodiments provide the computer that performs counterpart operations to at least some of the operations performed by the electronic device.

Other embodiments provide an integrated circuit for use with the electronic device or the second electronic device. The integrated circuit may perform at least some of the aforementioned operations.

Other embodiments provide a computer-readable storage medium for use with the electronic device, the second electronic device or the computer. When program instructions stored in the computer-readable storage medium are executed by the electronic device, the second electronic device or the computer, the program instructions may cause the electronic device, the second electronic device or the computer to perform at least some of the aforementioned operations of the electronic device, the second electronic device or the computer.

Other embodiments provide a method. The method includes at least some of the aforementioned operations performed by the electronic device, the second electronic device or the computer.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following

Note that like reference numerals refer to corresponding parts throughout the drawings. Moreover, multiple instances of the same part are designated by a common prefix separated from an instance number by a dash.

DETAILED DESCRIPTION

Figure 1:
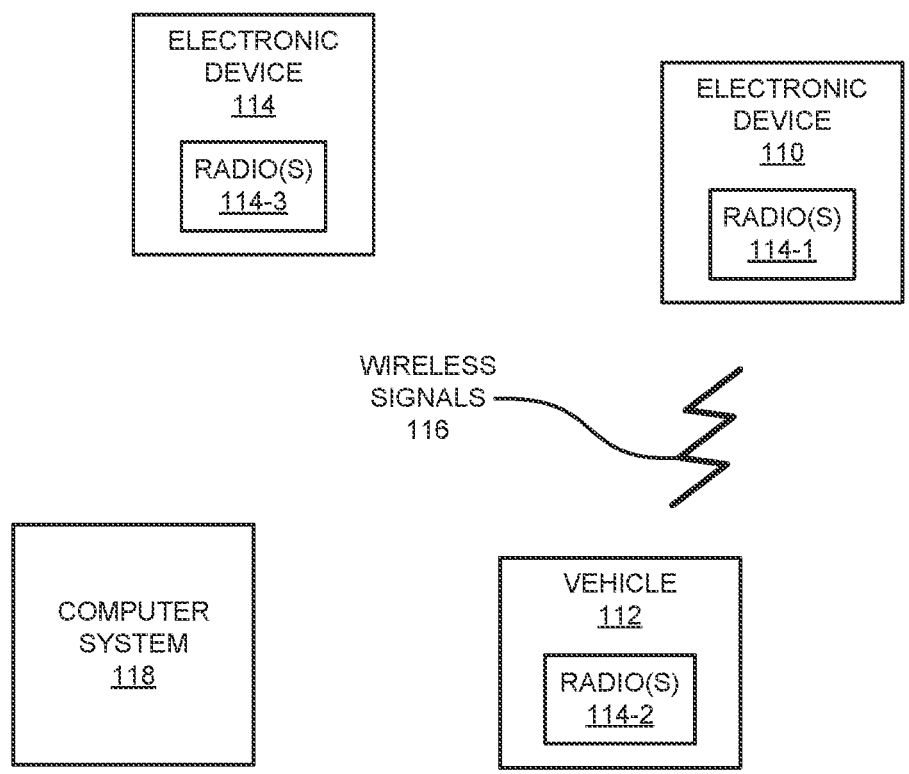
FIG. 1 illustrates an example of communication between electronic devices according to some embodiments of the disclosure.

Some embodiments include an electronic device that at least semi-automatically performs (or initiates) car-key pairing. During operation, the electronic device may perform wireless pairing with a second electronic device (such as a vehicle), where the wireless pairing establishes a connection between the electronic device and the second electronic device. Moreover, during the wireless pairing, the electronic device may receive information associated with the car-key pairing of the electronic device and the second electronic device. Then, after the wireless pairing is completed, the electronic device may determine that the car-key pairing is supported or available based at least in part on the information. Next, the electronic device selectively and at least semi-automatically may perform the car-key pairing based at least in part on the information, where the car-key pairing enables the electronic device to function as a digital key for the second electronic device using wireless communication via the wireless pairing or another communication protocol (such as near-field communication). For example, based at least in part on the information, the electronic device may select a starting point in a hierarchical process associated with the car-key pairing, thereby guiding a user into the correct entry point.

By at least semi-automatically performing the car-key pairing based at least in part on the information received during the wireless pairing, these communication techniques may allow the car-key pairing to be established with less time and effort. Consequently, the communication techniques may improve the user experience, which may encourage potential users to allow the electronic device to perform the car-key pairing and, then, to use the electronic device as a digital key for the second electronic device. In some embodiments, the communication techniques may increase awareness by users of the car-key-pairing feature and may guide them to the correct entry point or starting operation based at least in part on their circumstances into the car-key-pairing process.

Note that the communication techniques may be used during or with wireless communication between electronic devices in accordance with a communication protocol, such as Bluetooth or Bluetooth Low Energy, which are used as illustrative examples in the discussion that follows. However, the communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, California) that are referred to as an Apple Wireless Direct Link (AWDL). Moreover, the electronic device can communicate via: a communication protocol that is compatible with an IEEE 802.11 standard (which is sometimes referred to as Wi-Fi), a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, or other present or future developed IEEE 802.11 technologies.

Note that the electronic device may use multi-user transmission (such as OFDMA) and/or multiple-input multiple-output (MIMO).

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). Note that the access point may be a physical access point or a virtual or 'software' access point that is implemented on a computer or an electronic device. However, in other embodiments the electronic device may not be an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, an electronic device 110 (such as a smartphone, a laptop computer, a notebook computer, a tablet, or another such electronic device) and vehicle 112 (such as a car, a truck, a bus, a bicycle, a moped, a motorcycle, etc.) may communicate wirelessly using a Bluetooth or a Bluetooth Low Energy communication protocol. Thus, electronic device 110 and vehicle 112 may be paired or may have one or more connections with each other. For example, electronic device 110 and vehicle 112 may wirelessly communicate while: detecting one another by scanning wireless channels, transmitting and receiving frames on wireless channels, establishing connections (for example, by transmitting connect requests), and/or transmitting and receiving packets or frames (which may include the request and/or additional information, such as data, as payloads).

In some embodiments, electronic device 110 and/or vehicle 112 may wirelessly communicate with electronic device 114, such as a key fob (or a remote-control device that controls a remote keyless entry system and/or that enables a remote vehicle ignition system) for vehicle 112. Moreover, in some embodiments, electronic device 110 and/or vehicle 112 may communicate (e.g., wirelessly) with an optional remotely located computer system 118 that includes one or more computers (such as a cloud-based computer system).

Figure 6:
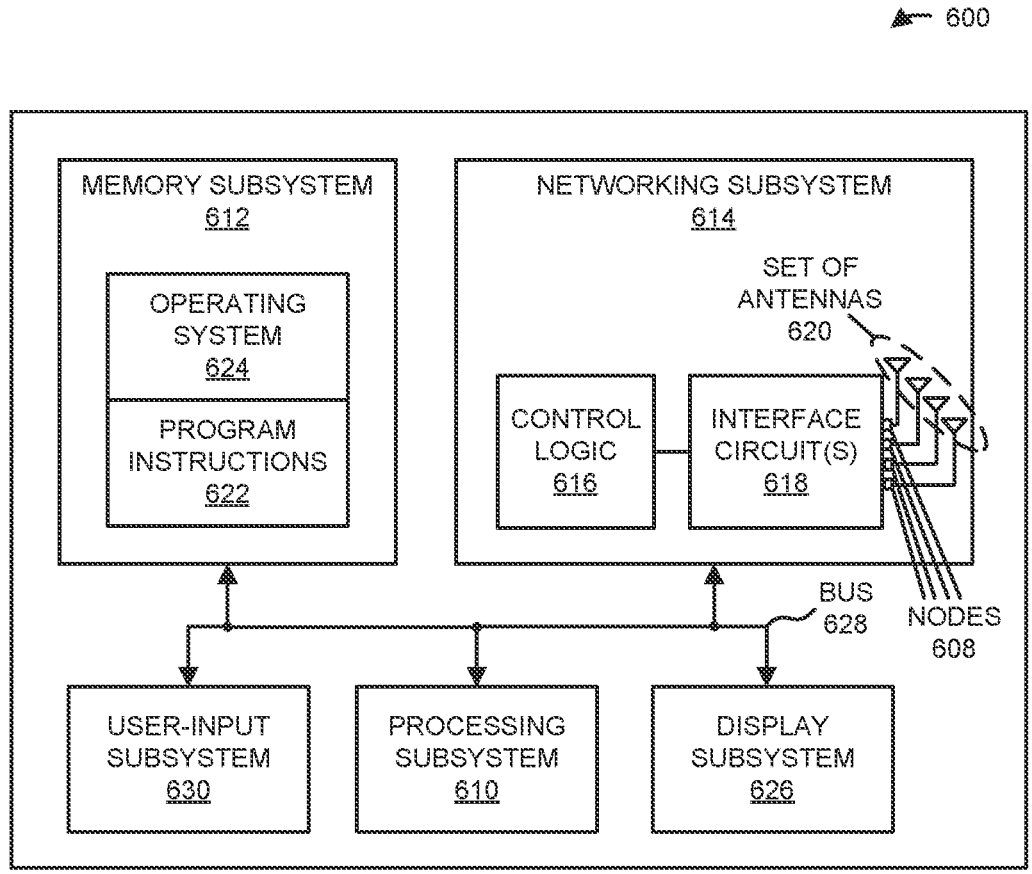
FIG. 6 illustrates an example of an electronic device of FIG. 1 according to some embodiments of the disclosure.

As described further below with reference to FIG. 6, electronic device 110, vehicle 112, electronic device 114 and computer system 118 may include subsystems, such as a networking subsystem, a memory subsystem, and a processor subsystem. In addition, electronic device 110, vehicle 112 and electronic device 114 may include radios 114 in the networking subsystems. More generally, electronic device 110, vehicle 112 and electronic device 114 can include (or can be included within) any electronic devices with networking subsystems that enable electronic device 110, vehicle 112 and electronic device 114, respectively, to wirelessly communicate with another electronic device. This can include transmitting frames or beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110 and vehicle 112, respectively. For example, as noted previously, electronic device 110 and vehicle 112 may exchange packets or frames using a Bluetooth or a Bluetooth Low Energy communication protocol. As illustrated further below with reference to FIGS. 2-5, one or more radios 114-1 may receive wireless signals 116 that are transmitted by one or more radios 114-2 via one or more connections between electronic device 110 and vehicle 112. Alternatively, the one or more radios 114-1 may transmit wireless signals 116 that are received by the one or more radios 114-2.

Note that the one or more radios 114-1 may consume additional power in a higher-power mode. If the one or more radios 114-1 remain in the higher-power mode even when they are not transmitting or receiving packets or frames, the power consumption of electronic device 110 may be needlessly increased. Consequently, electronic device 110 and/or vehicle 112 may include wake-up radios (WURs) that listen for and/or receive wake-up frames (and/or other wake-up communications), e.g., from vehicle 112. When a particular electronic device (such as electronic device 110) receives a wake-up frame, the WUR may selectively wake-up radio 114-1, e.g., by providing a wake-up signal that selectively transitions at least one of the one or more radios 114-1 from a lower-power mode to the higher-power mode.

As discussed previously, establishing a wireless pairing between electronic device 110 and vehicle 112, and then configuring additional capabilities (such as car-key pairing) to enable electronic device 110 to perform one or more functions can be time consuming and complicated. For example, a prospective user may need to perform multiple manual operations in order to determine whether they can establish a car-key pairing between electronic device 110 and vehicle 112, and then to establish the car-key pairing. This cumbersome process may frustrate potential users, thereby discouraging them from establishing the car-key pairing and, thus, from using electronic device 110 as a digital key for vehicle 112. Note that in the present discussion a 'digital key' may have similar capabilities as electronic device 114 (e.g., a remote-control device that controls a remote keyless entry system and/or that enables a remote vehicle ignition system). However, unlike electronic device 114, electronic device 110 may not be dedicated solely to the digital key functionality (e.g., electronic device 110 may also be used for one or more different functions than those associated with a digital key). In some embodiments, a digital key may be compatible with a standard or a specification from the Car Connectivity Consortium® or CCC (of Beaverton, Oregon).

In order to address these challenges, as described below with reference to FIGS. 2-5, in some embodiments of the disclosed communication techniques electronic device 110 may selectively and at least semi-automatically perform (or initiate) car-key pairing between electronic device 110 and vehicle 112. In the present discussion, 'at least semi-automatically performing' may include at least bringing a user to the correct operation in a car-key pairing flow, thereby reducing unnecessary setup operations. For example, the 'at least semi-automatic performing; may inform a user if their vehicle supports car-key pairing and/or may increase awareness of users that their vehicles support digital car keys. This may help address the problem of many users being unaware of this feature (e.g., because they purchased it along with a large package of features and otherwise would not bother to set it up). In some embodiments, 'at least semi-automatically performing' includes completing the car-key pairing flow without user intervention or manual operation(s).

Notably, electronic device 110 may perform wireless pairing with vehicle 112, where the wireless pairing establishes a connection between electronic device 110 and vehicle 112. Moreover, during the wireless pairing, electronic device 110 receives information associated with the car-key pairing of electronic device 110 and vehicle 112. Note that the wireless pairing may be compatible with a Bluetooth or a Bluetooth Low Energy communication protocol.

Then, after the wireless pairing is completed, electronic device 110 may determine that the car-key pairing is supported or available based at least in part on the information. For example, the information may specify one or more of: whether vehicle 112 is capable of (or supports) car-key pairing; whether software executing in an environment (such as an operating system) in vehicle 112 is capable of the car-key pairing; whether an upgrade to the software is capable of the car-key pairing; whether there is an existing account associated with a user of electronic device 110; whether proof of ownership of the has been established; or whether a passcode associated with the car-key pairing has been received. In some embodiments, 'support' or 'availability' may include one or more preconditions of car-key pairing, such as: a vehicle-account setup, linking to the vehicle, proof of ownership, such as physical possession of one or two key fobs in proximity or wireless range of a vehicle, etc.

Note that, when proof of ownership has not been established, electronic device 110 may receive a secure token associated with vehicle 112. Then, electronic device 110 may provide, to a computer in computer system 118, a request for the proof of ownership, where the request includes the secure token. Next, electronic device 110 may receive, from computer system 118, the proof of ownership. In some embodiments, electronic device 110 may receive, from vehicle 112 or computer system 118, information that specifies which proof of ownership is needed for this vehicle. When the proof of ownership is not presented, electronic device 110 may present or show this information to the user, e.g., by displaying it in a user interface on a display in or associated with electronic device 110. For example, electronic device 110 may display a message, such as: "You need to bring two key fobs to start owner pairing."

Next, electronic device 110 may selectively and at least semi-automatically performs the car-key pairing based at least in part on the information, where the car-key pairing enables electronic device 110 to function as a digital key for vehicle 112 using wireless communication via the wireless pairing or another communication protocol (such as near-field communication). Notably, based at least in part on the information, electronic device 110 may select a starting point in a hierarchical process associated with the car-key pairing.

In summary, the communication techniques may facilitate and, thus, encourage use of car-key pairing between electronic device 110 and vehicle 112. Notably, using information provided during wireless pairing, the communication techniques may allow electronic device 110 to simplify and at least semi-automate establishing of the car-key pairing between electronic device 110 and vehicle 112.

In the described embodiments, processing a packet or frame in electronic device 110 and vehicle 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the one or more connections in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple connections or links may be used during communication between electronic device 110 and vehicle 112. Moreover, while electronic device 110 performed operations in the communication techniques, in other embodiments at least some of these operations may be performed by vehicle 112 and/or computer system 118. Consequently, electronic device 110, vehicle 112 and/or computer system 118 may perform operations in the communication techniques.

In some embodiments, electronic device 110 may support sharing of one or more instances of a digital car key, e.g., with one or more other electronic devices.

Figure 2:
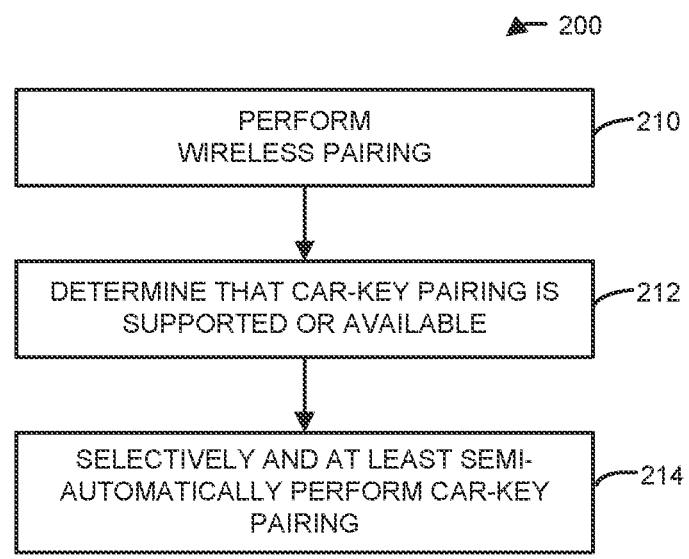
FIG. 2 illustrates an example method for selectively and at least semi-automatically performing car-key pairing according to some embodiments of the disclosure.

FIG. 2 presents a flow diagram illustrating an example method 200 for selectively and at least semi-automatically performing car-key pairing. This method may be performed by an electronic device, such as electronic device 110 in FIG. 1.

During operation, the electronic device may perform wireless pairing (operation 210) with a second electronic device, where the wireless pairing establishes a connection between the electronic device and the second electronic device. Moreover, during the wireless pairing, the electronic device receives information associated with the car-key pairing of the electronic device and the second electronic device. Note that the wireless pairing may be compatible with a Bluetooth or a Bluetooth Low Energy communication protocol. Furthermore, the second electronic device may include a vehicle, such as a car, a truck, a bus, a bicycle, a moped, a motorcycle, etc.

Then, after the wireless pairing (operation 210) is completed, the electronic device may determine that the car-key pairing is supported or available (operation 212) based at least in part on the information. For example, the information may specify one or more of: whether the second electronic device is capable of (or supports) car-key pairing; whether software executing in an environment in the second electronic device is capable of the car-key pairing; whether an upgrade to the software is capable of the car-key pairing;

whether there is an existing account associated with a user of the electronic device; whether proof of ownership of the second electronic device has been established; or whether a passcode associated with the car-key pairing has been received.

Next, the electronic device may selectively and at least semi-automatically perform the car-key pairing (operation 214) based at least in part on the information, where the car-key pairing enables the electronic device to function as a digital key for the second electronic device using wireless communication via the wireless pairing or another communication protocol (such as near-field communication).

In some embodiments, the electronic device optionally performs one or more additional operations. For example, when proof of ownership has not been established, the electronic device may receive a secure token associated with the second electronic device. Then, the electronic device may provide, addressed to a computer, a request for the proof of ownership, where the request includes the secure token. Next, the electronic device may receive, associated with the computer, the proof of ownership.

Additionally, based at least in part on the information, the electronic device may select a starting point in a hierarchical process associated with the car-key pairing.

In some embodiments of method 200, there may be additional or fewer operations. Further, one or more different operations may be included. Moreover, the order of the operations may be changed, and/or two or more operations may be combined into a single operation or performed at least partially in parallel.

Figure 3:
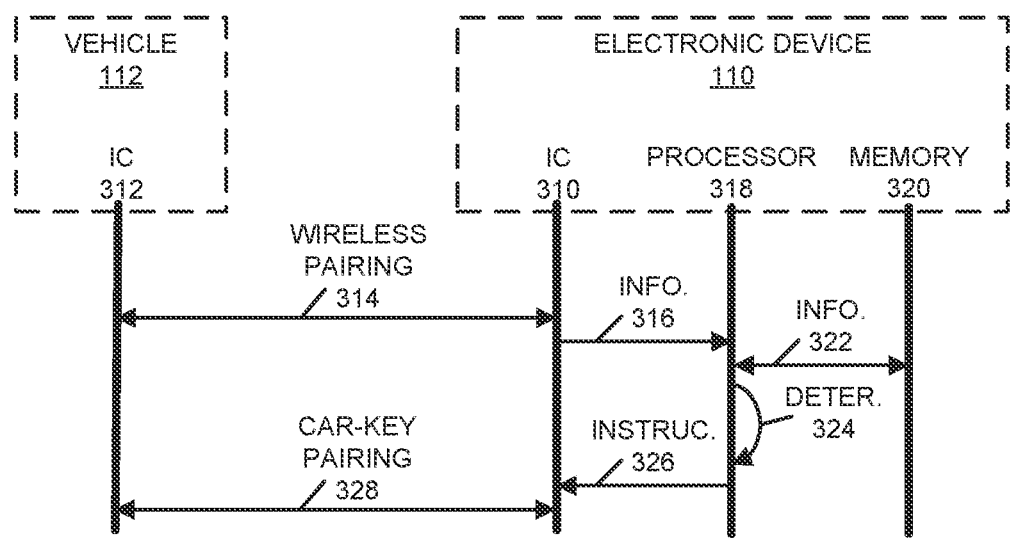
FIG. 3 illustrates an example of communication among components, e.g., in the electronic devices of FIG. 1 according to some embodiments of the disclosure.

The communication techniques are further illustrated in FIG. 3, which presents a flow diagram illustrating an example of communication among components in electronic device 110 and vehicle 112. During operation, an interface circuit (IC) 310 in electronic device 110 may establish a connection with an interface circuit 312 in vehicle 112 performing wireless pairing using wireless communication 314. Moreover, during the wireless pairing, interface circuit 310 may receive, from vehicle 112, information 316 associated with car-key pairing of electronic device 110 and vehicle 112.

Then (e.g., after the wireless pairing is completed), interface circuit 310 may provide information 316 to processor 318 in electronic device 110. Furthermore, processor 318 may optionally access, in memory 320 in electronic device 110, optional information 322 associated with car-key pairing of electronic device 110 and vehicle 112. Note that information 322 may, at least in part, be different from information 316. Thus, electronic device 110 may, as needed, supplement information 316.

Next, processor 318 may determine 324 that the car-key pairing is supported or available based at least in part on information 316 and/or 322. Additionally, processor 318 may instruct 326 interface circuit 310 to selectively and at least semi-automatically perform car-key pairing 328 based at least in part on information 316 and/or 322, where the car-key pairing 328 enables electronic device 110 to function as a digital key for vehicle 112 using wireless communication via the wireless pairing (e.g., via the connection) or another communication protocol (such as near-field communication).

While communication between the components in FIG. 3 is illustrated with unilateral or bilateral communication (e.g., lines having a single arrow or dual arrows), in general a given communication operation may be unilateral or bilateral.

Figure 4:
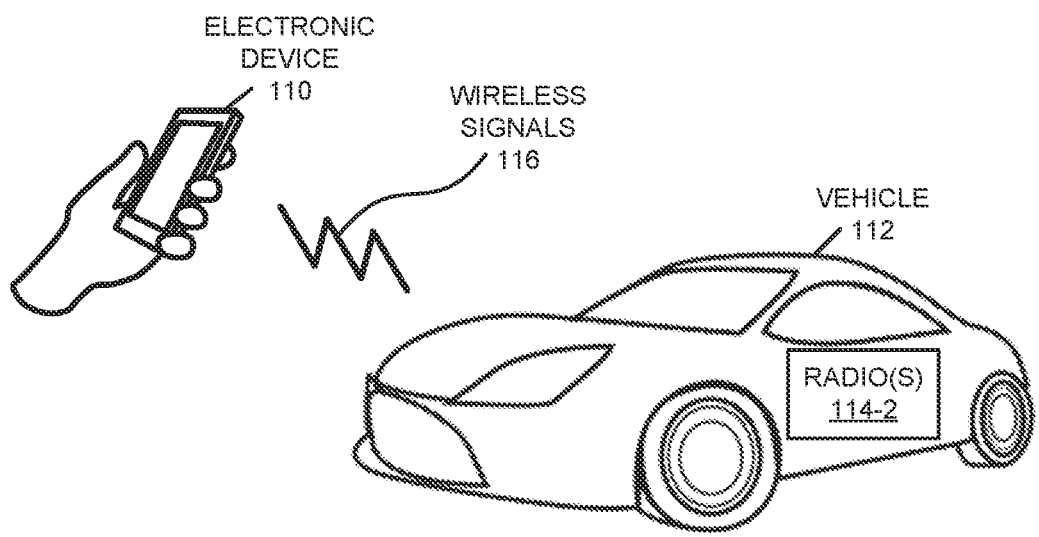
FIG. 4 illustrates an example of communication between electronic devices according to some embodiments of the disclosure.

We now further discuss the communication techniques. FIG. 4 presents an example of communication between electronic device 110 and vehicle 112. Notably, as illustrated in FIG. 4, electronic device 110 may include a cellular telephone and vehicle 112 may include a car or an automobile, which may be owned and/or operated by a user of electronic device 110.

Because of limited public awareness, users may not be aware that their vehicle (such as vehicle 112) supports a digital key, such as a digital key that is compatible with the Car Connectivity Consortium. In addition, many users may not know how to start or initiate the owner pairing process between their electronic device (such as electronic device 110) and their vehicle. In general, more users know how to wirelessly pair their electronic devices in Bluetooth or Bluetooth Low Energy (such as using CarPlay developed by Apple in Cupertino, California).

In order to address these problems and to assist a user in starting at the correct operation in a car-key-pairing process, the communication techniques may at least semi-automatically initiate or perform car-key pairing when wireless pairing between electronic device 110 and vehicle 112 has been completed. Moreover, electronic device 110 may receive information from vehicle 112 during the wireless pairing that is then used to determine whether car-key pairing can be performed (e.g., it is supported or available for vehicle 112 or the user of electronic device 110) and, if yes, what is the correct operation or start point in a hierarchical car-key pairing process. These capabilities may allow users to discover and then use the car-key feature in a convenient and at least semi-automated manner.

Figure 5:
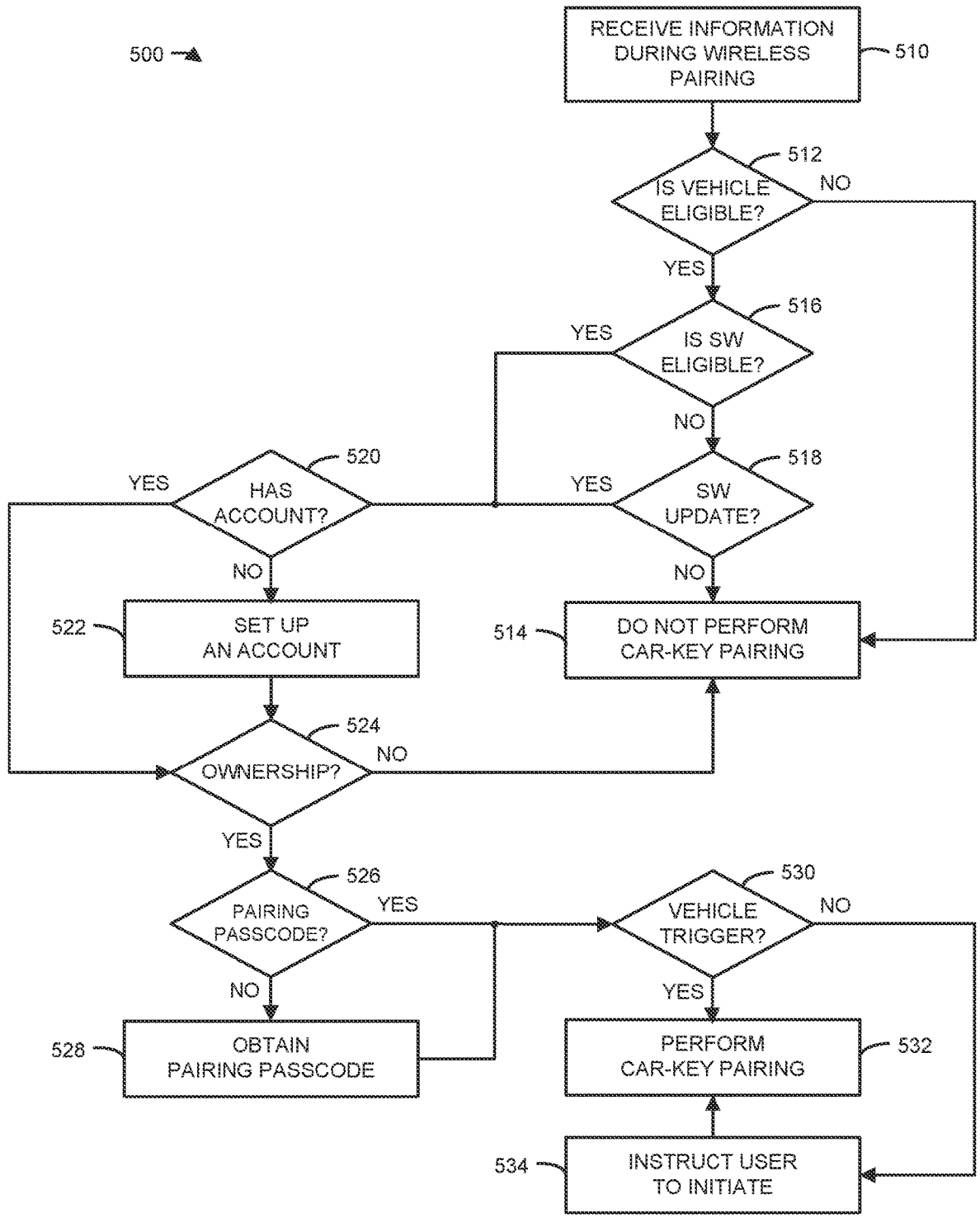
FIG. 5 illustrates an example method for selectively and at least semi-automatically performing car-key pairing according to some embodiments of the disclosure.

FIG. 5 presents a flow diagram illustrating an example method 500 for selectively and at least semi-automatically performing car-key pairing. This method may be performed by an electronic device, such as electronic device 110 in FIG. 1. Notably, the electronic device may receive information during wireless pairing (operation 510) between the electronic device and a vehicle. Based at least in part on the information, the electronic device may perform one or more operations in method 500. In particular, the electronic device may use the information to determine whether the vehicle (e.g., the vehicle hardware) is eligible for (or supports) car-key pairing (operation 512). For example, the electronic device may determine whether the user paid for the car-key-pairing feature when they purchased the vehicle. If not (operation 512), the car-key pairing may not be performed (operation 514) by the electronic device and method 500 may terminate.

Otherwise (operation 512), the electronic device may use the information to determine whether the vehicle software is eligible (or supports) the car-key pairing (operation 516). If not (operation 516), the electronic device may use the information to determine whether a software update for the vehicle is available (operation 518) to allow the vehicle to support the car-key pairing. For example, based at least in part on the information, the electronic device may check for a software update for the vehicle on a website or web page associated with a manufacturer or provider of the vehicle. Moreover, if not (operation 518), the car-key pairing may not be performed (operation 514) by the electronic device and method 500 may terminate.

Alternatively, if the software is eligible (operation 516) or there is a software update (operation 518), the electronic device may use the information to determine whether the user has already set up an account (operation 520), such as whether the user has set up an account with a manufacturer or provider of the vehicle and provided credentials (such as a username and password). For example, the information may specify whether the vehicle is paired to an account (such as a connected drive account) so that the information associated with a vehicle telematics service for the vehicle has already been set up. Note that when there is a software update (operation 518), the electronic device 110 may instruct the user to initiate and successfully perform the software update before proceeding to operation 520. However, in some embodiments when there is a software update, the electronic device 110 may instruct the vehicle to at least semi-automatically initiate and successfully perform the software update before proceeding to operation 520.

If the user does not already have an account (operation 520), the electronic device may instruct the user to set up an account (operation 522) before proceeding. Moreover, if the user already has an account (operation 520) or after the user has set up an account (operation 522), the electronic device may use the information to determine whether ownership of the vehicle has been successfully established (operation 524). For example, the electronic device may detect whether one or more car fobs (such as electronic device 114 in FIG. 1) associated with the vehicle are within wireless range of the electronic device. Physical possession of the one or more car fobs by the user in wireless range of electronic device 110 and/or vehicle 112 may establish that the user is the owner (or is allowed to use) the vehicle 112. Alternatively, the electronic device may receive a secure token from the vehicle. Then, the electronic device may provide, to a computer, a request (which includes the secure token) for the proof of ownership, and in response the electronic device may receive the proof of ownership from the computer. If the user is not the owner or proof of ownership has not been established (operation 524), the car-key pairing may not be performed (operation 514) by the electronic device and method 500 may terminate.

Otherwise (operation 524), the electronic device may use the information to determine whether the user has been provided or has received a pairing passcode (operation 526) that allows the user to use a (software) application installed in the electronic device and the vehicle to perform the car-key pairing. Note that the pairing passcode may be emailed to the user after they purchased the vehicle and set up the account. If not (operation 526), the electronic device may instruct or assist the user in obtaining the pairing passcode (operation 528). For example, if the application is not installed on the electronic device, the electronic device may open an email client or application on the electronic device, may search for an onboarding email from a manufacturer or provider of the vehicle (which includes the passcode), and may present the onboarding email to the user (e.g., the onboarding email may be displayed on a display of the electronic device). Furthermore, when the application has not been installed on the electronic device, the electronic device may instruct the user to download or install the application onto the electronic device, e.g., from a web-based application store. (Alternatively, if the onboarding email cannot be found and an answer to operation 530 (see below) is yes, the electronic device may instruct the user to download (or re-install) the application onto the electronic device, e.g., from the web-based application store, or to initiate or start the application from the vehicle (e.g., by clicking on or activating a pairing button or virtual icon in a user interface), so the electronic device and the vehicle at least semi-automatically perform the car-key pairing.)

Moreover, if the user has the pairing passcode (operation 526) or after the user has obtained the pairing passcode (operation 528), the electronic device may use the information to determine whether the vehicle can trigger or start the application (operation 530). If yes (operation 530), the electronic device may instruct the vehicle to start the application on the electronic device (e.g., by providing a trigger message with the pairing code to the electronic device), so the electronic device and the vehicle at least semi-automatically perform the car-key pairing (operation 532). Otherwise (operation 530), the electronic device may instruct the user to initiate or start the application (operation 534) on the electronic device (e.g., by providing the pairing code to the application and then clicking on or activating a pairing button or virtual icon in a user interface), so the electronic device and the vehicle at least semi-automatically perform the car-key pairing (operation 532). In some embodiments, when the user has not already installed the application on the electronic device, the operation 534 may include instructing the user to download the application onto the electronic device, e.g., from the web-based application store.

Note that method 500 may allow electronic device to determine the correct or appropriate starting point for the user in a car-key-pairing process.

In some embodiments of method 500, there may be additional or fewer operations. Further, one or more different operations may be included. Moreover, the order of the operations may be changed, and/or two or more operations may be combined into a single operation or performed at least partially in parallel.

While method 500 illustrated the communication techniques with an application that is installed on and executes on the electronic device, in other embodiments the car-key pairing may be performed without using the application. For example, after the user receives the passcode (e.g., in the onboarding email), the user may provide the passcode to a wallet application on the electronic device (e.g., by clicking on or activating a button or virtual icon in a user interface on the electronic device). Then, using the wallet application, the user may perform the car-key pairing with the vehicle via an HTTP link between the electronic device and the vehicle.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using channels or frequency sub-bands, in other embodiments the communication techniques may involve the concurrent use of different temporal slots, and/or or a combination of different frequency sub-bands, different frequency bands and/or different temporal slots.

Moreover, while the preceding embodiments illustrated the use of Bluetooth or Bluetooth Low Energy in the communication techniques, in other embodiments of the communication techniques Wi-Fi is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 7 GHz frequency band, a 60 GHz frequency band, a Citizens Broadband Radio Service (CBRS) frequency band, a band of frequencies used by LTE, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 6 presents a block diagram of an electronic device 600 (which may be a cellular telephone, a smartwatch, an access point, an IoT device, another electronic device, etc.) in accordance with some embodiments. This electronic device includes processing subsystem 610, memory subsystem 612 and networking subsystem 614. Processing subsystem 610 includes one or more devices configured to perform computational operations. For example, processing subsystem 610 can include one or more microprocessors, application-specific integrated circuits (ASICs), microcontrollers, graphics processing units (GPUs), programmable-logic devices, and/or one or more digital signal processors (DSPs).

Memory subsystem 612 includes one or more devices for storing data and/or instructions for processing subsystem 610, and/or networking subsystem 614. For example, memory subsystem 612 can include dynamic random access memory (DRAM), static random access memory (SRAM), a read-only memory (ROM), flash memory, and/or other types of memory. In some embodiments, instructions for processing subsystem 610 in memory subsystem 612 include: program instructions or sets of instructions (such as program instructions 622 or operating system 624), which may be executed by processing subsystem 610. For example, a ROM can store programs, utilities or processes to be executed in a non-volatile manner, and DRAM can provide volatile data storage, and may store instructions related to the operation of electronic device 600. Note that the one or more computer programs may constitute a computer-program mechanism, a computer-readable storage medium or software. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610. In some embodiments, the one or more computer programs are distributed over a network-coupled computer system so that the one or more computer programs are stored and executed in a distributed manner.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), such as: control logic 616, one or more interface circuits 618 and a set of antennas 620 (or antenna elements) in an adaptive array that can be selectively turned on and/or off by control logic 616 to create a variety of optional antenna patterns or 'beam patterns.' Alternatively, instead of the set of antennas, in some embodiments electronic device 600 includes one or more nodes 608, e.g., a pad or a connector, which can be coupled to the set of antennas 620. Thus, electronic device 600 may or may not include the set of antennas 620. For example, networking subsystem 614 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 614 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or frame frames and/or scanning for advertising frames transmitted by other electronic devices.

Within electronic device 600, processing subsystem 610, memory subsystem 612 and networking subsystem 614 are coupled together using bus 628 that facilitates data transfer between these components. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc. Display subsystem 626 may be controlled by processing subsystem 610 to display information to a user (e.g., information relating to incoming, outgoing, or an active communication session).

Electronic device 600 can also include a user-input subsystem 630 that allows a user of the electronic device 600 to interact with electronic device 600. For example, user-input subsystem 630 can take a variety of forms, such as: a button, keypad, dial, touch screen, audio input interface, visual/image capture input interface, input in the form of sensor data, etc.

Electronic device 600 can be (or can be included in) any electronic device with at least one network interface. For example, electronic device 600 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. In some embodiments, electronic device may include an analysis subsystem that performs at least some of the operations in the communication techniques. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in the one or more interface circuits 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614. This integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Bluetooth or a Bluetooth Low Energy communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for an interface circuit in networking subsystem 614) or in firmware in an interface circuit networking subsystem 614. Alternatively or additionally, at least some of the operations in the communication techniques may be implemented in a physical layer, such as hardware in an interface circuit in networking subsystem 614. In some embodiments, the communication techniques are implemented, at least in part, in a MAC layer and/or in a physical layer in an interface circuit in networking subsystem 614.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna node configured to communicatively couple to an antenna; and
an interface circuit, communicatively coupled to the antenna node, configured to communicate with a vehicle system;
a processor coupled to the interface circuit; and
memory, coupled to the processor, storing program instructions, wherein, when executed by the processor, the program instructions cause the electronic device to perform operations comprising:
performing wireless pairing with the vehicle system, wherein the wireless pairing establishes a connection with the vehicle system, and, during the wireless pairing, the electronic device receives information associated with car-key pairing of the electronic device and the vehicle system;
after the wireless pairing is completed, determining that the car-key pairing is supported or available based at least in part on the information, wherein the information is different from that associated with secure communication with the vehicle system, and the information indicates that proof of ownership corresponding to the vehicle system has been established; and
selectively and at least semi-automatically performing the car-key pairing based at least in part on the information, wherein the car-key pairing enables the electronic device to function as a digital key for a vehicle associated with the vehicle system.

2. The electronic device of claim 1, wherein the wireless pairing is compatible with a Bluetooth or a Bluetooth Low Energy communication protocol.

3. The electronic device of claim 1, wherein, when the car-key pairing is not supported or available, the operations comprise determining whether a software update for the vehicle is available to allow the vehicle system to support the car-key pairing.

4. The electronic device of claim 1, wherein the information specifies one or more of: whether the vehicle system is capable of the car-key pairing; whether software executing in an environment in the vehicle system is capable of the car-key pairing; whether an upgrade to the software is capable of the car-key pairing; whether there is an existing account associated with a user of the electronic device; or whether a passcode associated with the car-key pairing has been received.

5. The electronic device of claim 4, wherein, when proof of ownership has not been established, the operations comprise:
receiving a secure token associated with the vehicle system;
providing, addressed to a computer, a request for the passcode, wherein the request comprises the secure token; and
receiving, associated with the computer, the proof of ownership.

6. The electronic device of claim 1, wherein the operations comprise selecting, based at least in part on the information, a starting point in a hierarchical process associated with the car-key pairing.

7. The electronic device of claim 1, wherein, when a software update is available, and prior to selectively and semi-automatically performing the car-key pairing, the operations comprise instructing the vehicle to at least semi-automatically initiate and successfully perform the software update.

8. A non-transitory computer-readable storage medium for use in conjunction with an electronic device, the computer-readable storage medium storing program instructions, wherein, when executed by the electronic device, cause the electronic device to perform operations comprising:
performing wireless pairing with the vehicle system, wherein the wireless pairing establishes a connection with the vehicle system, and, during the wireless pairing, the electronic device receives information associated with car-key pairing of the electronic device and the vehicle system;
after the wireless pairing is completed, determining that the car-key pairing is supported or available based at least in part on the information, wherein the information is different from that associated with secure communication with the vehicle system, and the information indicates that proof of ownership corresponding to the vehicle system has been established; and
selectively and at least semi-automatically performing the car-key pairing based at least in part on the information, wherein the car-key pairing enables the electronic device to function as a digital key for a vehicle associated with the vehicle system.

9. The non-transitory computer-readable storage medium of claim 8, wherein the wireless pairing is compatible with a Bluetooth or a Bluetooth Low Energy communication protocol.

10. The non-transitory computer-readable storage medium of claim 8, wherein, when the car-key pairing is not supported or available, the operations comprise determining whether a software update for the vehicle is available to allow the vehicle system to support the car-key pairing.

11. The non-transitory computer-readable storage medium of claim 8, wherein the information specifies one or more of: whether the vehicle system is capable of the car-key pairing; whether software executing in an environment in the vehicle system is capable of the car-key pairing; whether an upgrade to the software is capable of the car-key pairing; whether there is an existing account associated with a user of the electronic device; or whether a passcode associated with the car-key pairing has been received.

12. The non-transitory computer-readable storage medium of claim 11, wherein, when proof of ownership has not been established, the operations comprise:
receiving a secure token associated with the vehicle system;
providing, addressed to a computer, a request for the passcode, wherein the request comprises the secure token; and
receiving, associated with the computer, the proof of ownership.

13. The non-transitory computer-readable storage medium of claim 8, wherein the operations comprise selecting, based at least in part on the information, a starting point in a hierarchical process associated with the car-key pairing.

14. A method for selectively and at least semi-automatically performing car-key pairing, comprising:
by an electronic device:
performing wireless pairing with the vehicle system, wherein the wireless pairing establishes a connection with the vehicle system, and, during the wireless pairing, the electronic device receives information associated with car-key pairing of the electronic device and the vehicle system;
after the wireless pairing is completed, determining that the car-key pairing is supported or available based at least in part on the information, wherein the information is different from that associated with secure communication with the vehicle system, and the information indicates that proof of ownership corresponding to the vehicle system has been established; and
selectively and at least semi-automatically performing the car-key pairing based at least in part on the information, wherein the car-key pairing enables the electronic device to function as a digital key for a vehicle associated with the vehicle system.

15. The method of claim 14, wherein the wireless pairing is compatible with a Bluetooth or a Bluetooth Low Energy communication protocol.

16. The method of claim 14, wherein, when the car-key pairing is not supported or available, the method comprises determining whether a software update for the vehicle is available to allow the vehicle system to support the car-key pairing.

17. The method of claim 14, wherein the information specifies one or more of: whether the vehicle system is capable of the car-key pairing; whether software executing in an environment in the vehicle system is capable of the car-key pairing; whether an upgrade to the software is capable of the car-key pairing; whether there is an existing account associated with a user of the electronic device; or whether a passcode associated with the car-key pairing has been received.

18. The method of claim 17, wherein, when proof of ownership has not been established, the method comprises:
receiving a secure token associated with the vehicle system;
providing, addressed to a computer, a request for the passcode, wherein the request comprises the secure token; and
receiving, associated with the computer, the proof of ownership.

19. The method of claim 14, wherein the method comprises selecting, based at least in part on the information, a starting point in a hierarchical process associated with the car-key pairing.

20. The method of claim 14, wherein, when a software update is available and prior to selectively and semi-automatically performing the car-key pairing, the method comprises instructing the vehicle to at least semi-automatically initiate and successfully perform the software update.

* * * * *